US010348659B1

(12) United States Patent
Liu et al.

(10) Patent No.: US 10,348,659 B1
(45) Date of Patent: Jul. 9, 2019

(54) CHAT MESSAGE PROCESSING

(71) Applicant: International Business Machines Corporation, Armonk, NY (US)

(72) Inventors: Su Liu, Austin, TX (US); Fei Shen, Shanghai (CN); Lilian Lai, Taipei (TW); Louis Huang, Taipei (TW); Yin Qian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/849,872

(22) Filed: Dec. 21, 2017

(51) Int. Cl.
*H04L 12/58* (2006.01)
*H04M 1/725* (2006.01)

(52) U.S. Cl.
CPC .......... *H04L 51/063* (2013.01); *H04L 51/046* (2013.01); *H04L 51/10* (2013.01); *H04M 1/72552* (2013.01); *H04M 1/72555* (2013.01)

(58) Field of Classification Search
CPC ..... H04L 51/063; H04L 51/10; H04L 51/046; H04M 1/72552; H04M 1/72555
See application file for complete search history.

(56) References Cited

U.S. PATENT DOCUMENTS

| 9,665,567 B2* | 5/2017 | Liu .................. G06F 17/279 |
| 2009/0019117 A1* | 1/2009 | Bonforte ............ G06Q 10/107 709/206 |
| 2012/0047447 A1* | 2/2012 | Haq ................... G06F 3/04847 715/752 |
| 2016/0050169 A1 | 2/2016 | Ben Atar et al. |
| 2016/0292148 A1 | 10/2016 | Aley et al. |
| 2017/0052946 A1* | 2/2017 | Gu .................... G06F 17/279 |
| 2017/0060354 A1* | 3/2017 | Luo .................... H04L 51/10 |
| 2017/0185581 A1* | 6/2017 | Bojja .................. G06F 17/24 |
| 2017/0344224 A1* | 11/2017 | Kay ................... G06F 3/04817 |
| 2018/0336184 A1* | 11/2018 | Bellegarda ......... G06F 3/04817 |

FOREIGN PATENT DOCUMENTS

EP 2713323 A1 4/2014

OTHER PUBLICATIONS

Ashwini V. Yeole, P.V. Chavan, M.C. Nikose, Innovations in Information, Embedded and Communication Systems (ICIIECS), 2015 International Conference on Mar. 19-20, 2015.
Xiao Han, "Research on Emotion Recognition and the Usage of Emoticons in Social Media," University of Birmingham, 9 pages.

* cited by examiner

*Primary Examiner* — Brandon J Miller
(74) *Attorney, Agent, or Firm* — Patterson + Sheridan, LLP

(57) ABSTRACT

There is provided a method and system for processing a chat message. In this method, an emoji to be used in a chat session is obtained. And an emotion level is obtained, in which the emotion level is determined based on chat messages in the chat session. A type of emoji variation is determined according to the emotion level. And an emoji variation is provided according to the type of emoji variation and the obtained emoji.

20 Claims, 6 Drawing Sheets

CHAT MESSAGE PROCESSING

BACKGROUND

The present invention relates to data processing, and more specifically, to method, system and computer program product for processing chat messages.

Nowadays, people like to use instant messaging application for daily communication with others. In a chat session, users are increasingly using emoji to express their mood. Emoji have become increasingly popular worldwide since their international inclusion in smart phones. With emoji, both senders and receivers could make the typed text with emotion. Currently, emoji are static Unicode code point or stickers (pictures) which are pre-built in the application or the OS. If a user would like to have more icon to express, he/she has to import more stickers.

SUMMARY

According to one embodiment of the present invention, there is provided a method for processing a chat message. In this method, an emoji to be used in a chat session is obtained. And an emotion level is obtained, in which the emotion level is determined based on chat messages in the chat session. A type of emoji variation is determined according to the emotion level. And an emoji variation is provided according to the type of emoji variation and the obtained emoji.

According to another embodiment of the present invention, there is provided a system for processing a chat message. The system comprises one or more processors, a memory coupled to at least one of the processors, and a set of computer program instructions stored in the memory and executed by at least one of the processors in order to perform a method. In this method, an emoji to be used in a chat session is obtained. And an emotion level is obtained, in which the emotion level is determined based on chat messages in the chat session. A type of emoji variation is determined according to the emotion level. And an emoji variation is provided according to the type of emoji variation and the obtained emoji.

According to another embodiment of the present invention, there is provided a computer program product for processing a graph. The computer program product comprises a computer readable storage medium having program instructions embodied therewith. The program instructions are readable by a device to cause the device to perform a method for processing a chat message as mentioned above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
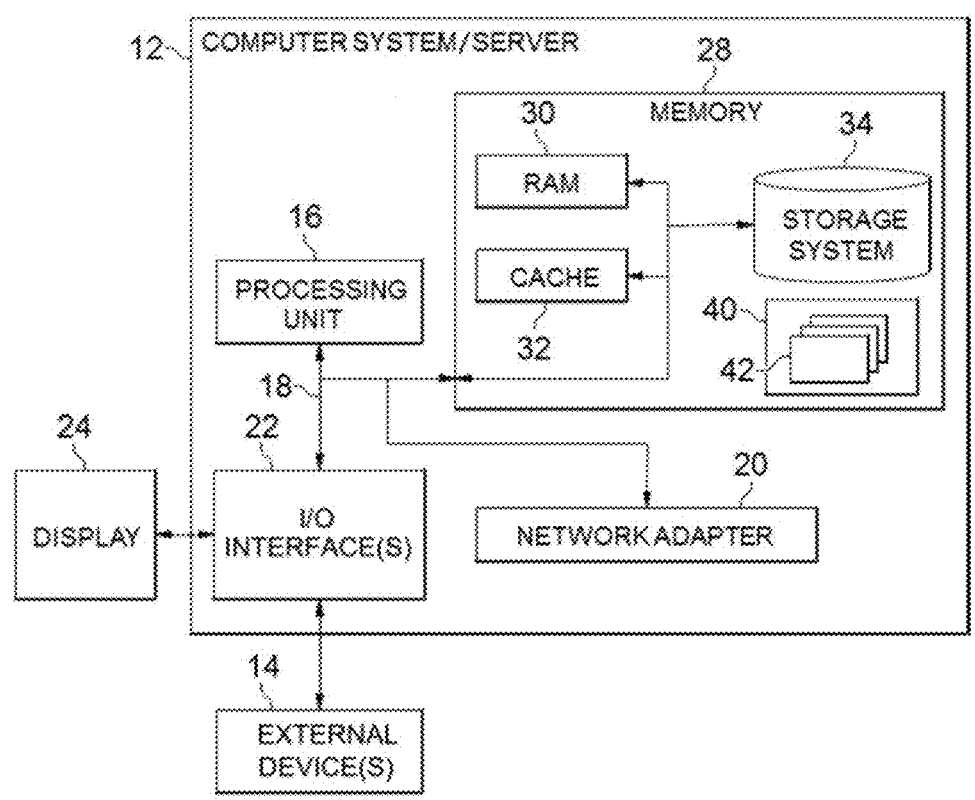
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
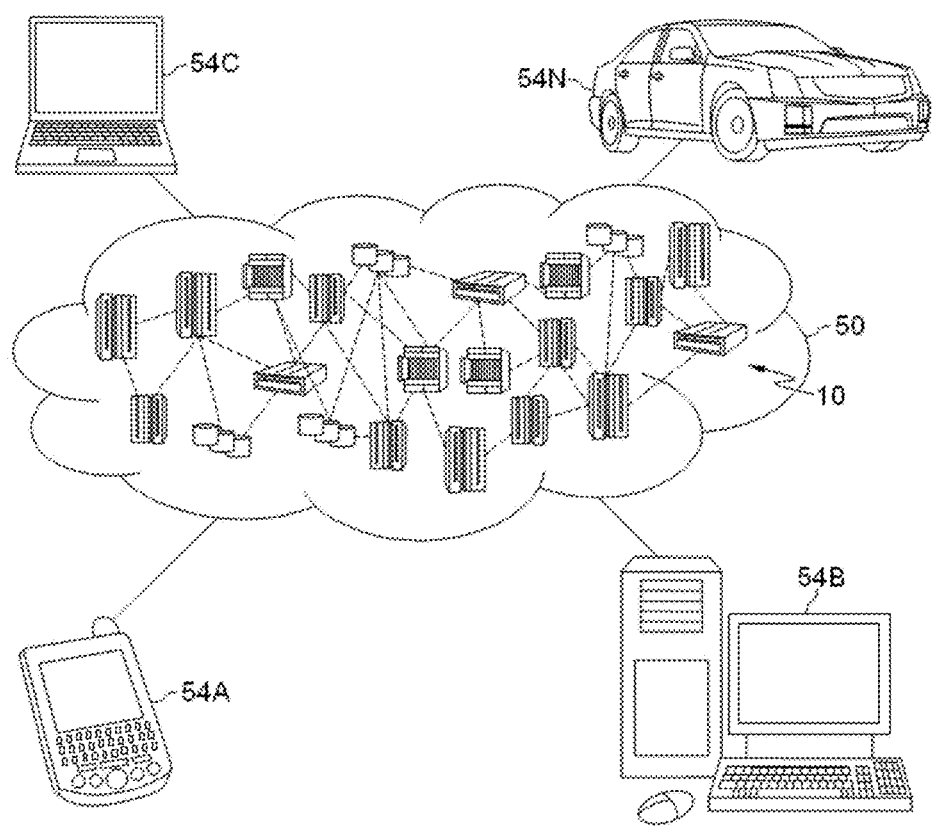
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
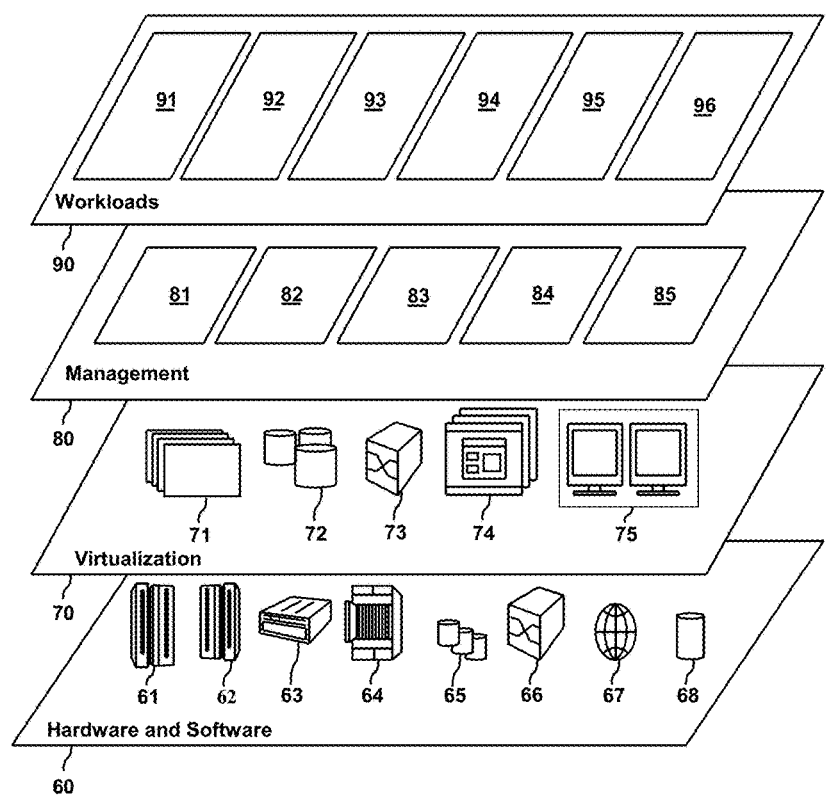
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat message processing 96.

As mentioned above, if a user would like to have more icons to express his emotion during a chat, he/she has to import more emoji. To enhance user's experience when using emoji, the embodiments of the present disclosure propose a solution to provide emoji variation according to the user's emotion during a chat.

Figure 4:
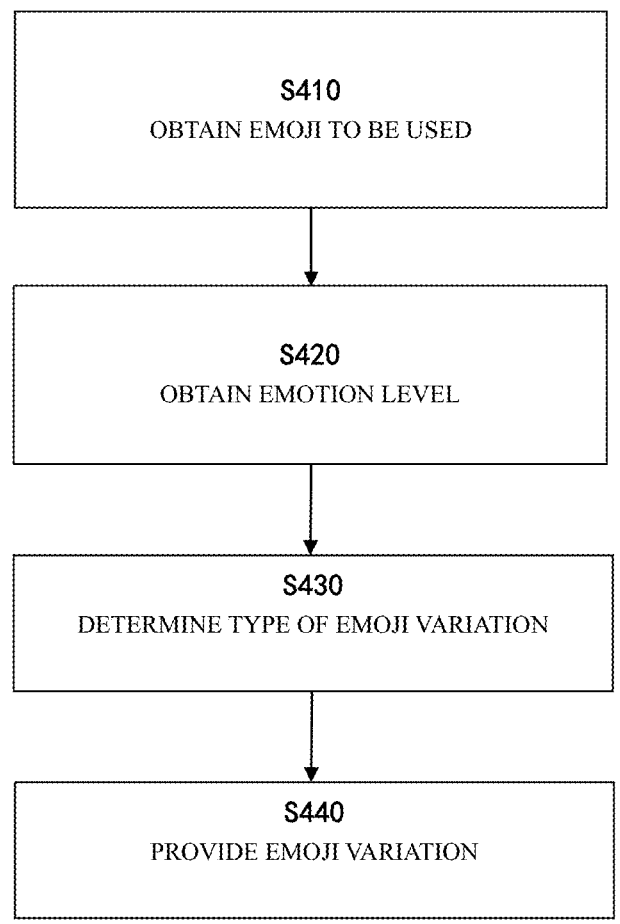
FIG. 4 shows an illustrative method for processing a chat message according to an embodiment of the present disclosure.

With reference now to FIG. 4, which shows a method of processing a chat message during a chat session according to an embodiment of the present disclosure.

In step S410, an emoji to be used in the chat session may be obtained. According to embodiments of the present disclosure, the emoji to be used in the chat session may obtained from a user selection. During the chat session, the user may want to use emoji to express his emotion, and choose an emoji from a pool of emoji. And the user's selection may be determined by any suitable method. For example, in one embodiment of the present disclosure, when the user moves his finger or the mouse on an emoji, it may be determined that the user has selected this emoji. And in another embodiment of the present disclosure, when the user clicks on an emoji, it may be determined that that user has selected the emoji. According to further embodiments of the present disclosure, the emoji to be used in the chat session may be obtained from a chat application's recommendation. For example, the chat application may monitor a chat message input by the user and recommend an emoji corresponding to the input chat message.

In step S420, an emotion level may be obtained, in which the emotion level is determined based on chat messages in the chat session.

According to an embodiment of the present disclosure, chat messages in current chat session may be analyzed, and the user's emotion may be obtained from the analysis. There are many existing emotion analysis methods which may be used here to analyze the content in the chat messages. For example, some knowledge based techniques may list obvious affect words, some statistical methods may leverage on elements from machine learning such as latent semantic analysis, etc. For the sake of simplicity, no detailed information will be provided here for the emotion analysis methods. According to embodiments of the present disclosure, the emotion may be divided into a plurality of emotion levels according to the analysis result, and each emotion level represents a different intensity of the emotion. And the emotion levels may be defined with different methods. More details about emotion levels will be described below.

In step S430, a type of emoji variation may be determined according to the obtained emotion level. According to embodiments of the present disclosure, the emoji variation may be an emoji with different variation type applied on the original emoji. The type of emoji variation may be, but not limited to, one or more following on the original emoji: shaking, jumping, color changing, size changing, repeating, and combinations of above, etc. Please note that the above types of emoji variations are just illustrative and are not limiting the scope of the present disclosure. Any suitable emoji variation types may be used in embodiments of the present disclosure.

In step S440, an emoji variation may be provided according to the type of emotion variation and the obtained emoji. For example, if the type of emotion variation is "shaking and jumping" and the emoji selected by the user is a grinning face, an emoji variation which is a shaking and jumping grinning face would be provided to the user.

With the method as shown in FIG. 4, the user would have more choices on emoji to express his emotion.

In some embodiments of the present disclosure, the emotion level obtained in step S420 may be defined by different methods. For example, according to the intensity of the emotion expressed in the user's previous chat messages, the emotion levels may be defined as low, medium, high. The emotion levels may also be expressed as level 1, 2, 3, etc. Alternatively, the emotion level may also be expressed as different ranges, such as "<0.2", "0.2-0.4", "0.4-0.6", "0.6-0.8", "0.8-1" etc.

In some embodiments of the present disclosure, different types of emoji variations may be defined for different emotion levels. For example, for an original grinning-face emoji, upon an emotion level 1, the variation may be a shaking and jumping grinning-face emoji, while upon an emotion level 2, the variation may be a larger size grinning-face emoji.

Figures 5, 6:
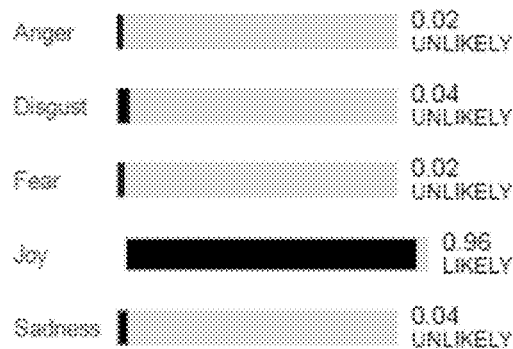
FIG. 5 shows exemplary emotion categories according to an embodiment of the present disclosure.
FIG. 6 shows an exemplary table of the types of emotion variations corresponding to different emotion categories and levels according to an embodiment of the present disclosure.

Furthermore, in some embodiments of the present disclosure, to express the user's emotion more accurately, the emotions may be classified into several categories. For example, as shown in FIG. 5, the emotion categories may include: Anger, Disgust, Fear, Joy and Sadness. Please note that the listed categories are just exemplary and not limited. And there may be at least one emotion level in each category. In the example shown in FIG. 5, the emotion category is "Joy" with a value of "0.96". The value may be used to indicate the emotion level. If there are five emotion levels for "Joy" category ("<0.2", "0.2-0.4", "0.4-0.6", "0.6-0.8", "0.8-1"), the emotion level would be "0.8-1". Different variations may be defined for each level in the category. For example, for an emoji in the category of Joy, upon an emotional level "medium", the variation type may be jumping, while for an emoji in the category of Fear, upon an emotional level "medium", the variation type may be shaking.

According to one embodiment of the present disclosure, the emotion category may be determined based on chat messages in the chat session. Any suitable emotion analysis method may be used here to analyze the content in the chat messages to determine the emotion category. Under such situation, in the method as illustrated in FIG. 4, both emotion category and emotion level would be obtained based on the chat messages, and the type of emotion variation would be determined based on the emotion category and emotion level.

According to another embodiment of the present disclosure, the emotion category may be determined based on the emoji obtained in step S410. Different emoji may be assigned to different categories. For example, a grinning face emoji may be assigned to the category of Joy. Therefore, if the user selects a grinning face, it may be determined that the emotion category is Joy. Under such situation, in the method as illustrated in FIG. 4, after obtaining the emotion category and the emotion level respectively, the type of emotion variation would be determined based on the emotion category and emotion level.

The person skilled in the art would understand that the above steps of obtaining a to-be-used emoji, obtaining an emotion level, and determining an emoji variation type may be executed substantially, concurrently, or in reverse order. For example, according to one embodiment of the present disclosure, the system may be designed that only when the user selects an emoji, an emoji variation type would be determined based on the emotion level expressed in previous chat messages. And according to another embodiment of the present disclosure, the emotion level and the type of emoji variation will be determined based on user's chat messages periodically. And when the user selects an emoji, the current determined emotion variation type may be used to obtain emoji variation. So the step of obtaining a to-be-used emoji may be performed concurrently with the other two steps or be performed after the other two steps. According to still another embodiment of the present disclosure, if the emotion category is needed to determine the variation type and the emotion category is decided according to the emoji selected by the user, then the step of obtaining a to-be-used emoji should be performed before the other two steps. All of those implementations should fall into the scope of the present disclosure.

FIG. 6 shows an exemplary table about the types of emotion variations corresponding to different emotion categories and levels. According to one embodiment of the present disclosure, one or more emotion variation types may be provided for each emotion level in the corresponding emotion category.

For example, for an emoji in the emotion category "Joy", if it's determined that the emotion level is "<0.2", which means that the user is in a normal happy mode, the emoji will be kept as original. If the emotion level is "0.2-0.4", which means that the user is in a happier mood than the previous level, the brightness of the emoji variations would be 2 times of the original emoji. Further, if the user is extremely happy, the emotion level becomes "0.8-1.0", the original emoji would become a shaking and jumping emoji, or the mouth level of the grinning face would be adjusted by image processing.

Please note that the table shown in FIG. 6 is just for illustrative purpose and should not be used as a limitation to the scope of the present disclosure. Although the table shown in FIG. 6 includes mapping among types of emotion variations, emotion categories and levels, the person skilled in the art would understand that the table may just include a mapping between emotion variation types and emotion levels.

Also, the person skilled in the art would understand that any suitable formats may be used to show mappings between emotion levels and the type of emotion variations. According to one embodiment of the present disclosure, the mappings may be predefined by the chat system. According to another embodiment of the present disclosure, the mappings may be defined or adjusted by the user according to the user's preference. Under such situation, to ensure that the emoji variation presented to the receiver is same with what is presented to the user, the adjustment to mapping by the user may also be informed to the receiver.

Figure 7:
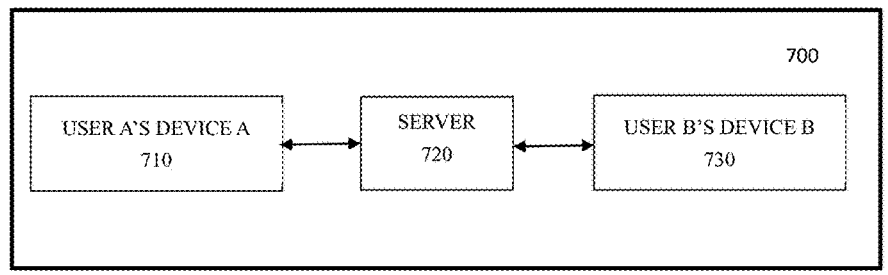
FIG. 7 shows an illustrative chat system which implements the method according to embodiments of the present disclosure.

FIG. 7 shows an illustrative chat system which may implement the method according to embodiments of the present disclosure. The chat system 700 includes a device A 710 used by user A, a server 720 and a device B used by user B 730. The device A 710 and device B 730 may be any suitable device which may be used by the users to chat with each other. And the server 720 may be any suitable server which may process the chat session between the device A and device B.

Let's use the system 700 as an example to show the chat process between user A and user B.

User A is having a chat session with User B. All of the chat messages will be communicated between the device A 710 and the device B 730 through the server 720. During the chatting, user A may want to use an emoji to express his current mood, and selects one from a pool of emoji. After receiving chat messages from device A, the server 720 may analyze the user A's current emotion based on the chat messages from user A or chat messages between user A and user B, and determine an emotion level accordingly. The person skilled in the art would understand that any suitable emotion analysis method may be used here to implement the emotion analysis.

The emotion level determined by the server 720 may be provided to the device A 710. And a type of emotion variation may be determined by device A 710 according to the emotion level. For example, the device A may determine the emotion variation type by querying a table with mappings between emotion variation types and emotion levels. And then, the device A may provide an emotion variation according to the determined type of emotion variation and the emoji selected by the user A. For example, the device A may implement the emotion variation to present to the user A.

According to one embodiment of the present disclosure, to implement the variation, CSS (Cascading Style Sheets) may be used to manipulate the emoji element, as most of messaging applications are web applications or hybrid applications. According to another embodiment of the present disclosure, TEXT API may be used to implement the variation if the applications do not support CSS. The person skilled in the art would understand that any suitable method may also be used to implement the variations.

Below is an example of using CSS to implement the variation. In the following example, a wrapper element <span class="heartbeat"></span> around the emoji is added. And the following CSS is added to make it animate like a heartbeat.

@keyframes kf-heartbeat {
  0% {
  transform: scale(1);
  }
  100%{
  transform: scale(2);
  }
}
span.heartbeat {
  animation: 1s ease 0s alternate none infinite running kf-heartbeat;
  transform: scale(1);
}

With the above rendering method, after the user A selects an original emoji, an emoji variation would be presented to the user A at the same time for user selection. The person skilled in the art would understand that more than one variation types may be provided for a specific emotion level, therefore, more than one variations may be presented to the user for selection. If the user A believes that one of the provided variations can express his current emotion more accurately and chooses one of the provided emoji variations, the user A's choose on the specific emoji variation may be provided to server 720 as part of a chat message.

According to one embodiment of the present disclosure, the chat message may include the Unicode of the original emoji as well as a variation indication. The variation indication may be an information indicating the type of the variation. The variation indication may be any suitable information indicating to the server 720 about the user's selection on the variations. For example, the variation indication may be the emotion level information itself as provided to the device A 710 by the server 720. The variation indication may also be a JSON element showing the type of variation. The variation indication may also be a plain text string indicating the variation type, for example, "shaking and jumping".

The server 720 receives the chat message from user A, which includes Unicode of an emoji and a variation indication, and sends the chat message to the user B's device B 730. The device B 730 receives the chat message and implements the emoji variation embedded in the chat message. The device B 730 may use the same way to implement the variation as the device A 710. The emoji variation is then presented to user B.

Figure 8:
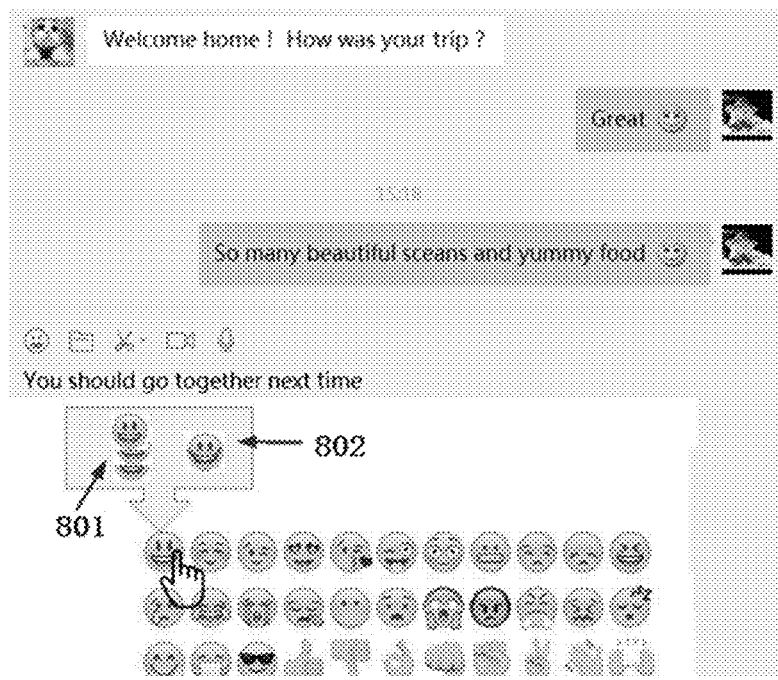
FIG. 8 shows an illustrative chat window with emotion variations provided according to the user's current emotion.

FIG. 8 shows an illustrative chat window with emotion variations provided according to the user's current emotion. For example, the system analyzes the chat session continuously and finds that the user is so joyful with a value of 0.96, which falls into the emotion level (0.8-1.0). When the user presses the grinning face, it pops the emoji variations with level (0.8-1.0) for selection. One is a grinning face which is jumping and shaking, as shown by 801 in FIG. 8, and another is a grinning face which is blinking with color changed, as shown by 802 in FIG. 8. The user may choose one of the variations or the original emoji to show in the chat window. For example, if the user moves the finger to one of the variations without leaving the screen and then lifts the finger, that variation will be selected for input. The person skilled in the art would understand that any suitable method may also be used to select the variations.

According to one embodiment of the present disclosure, when transferring the emotion variation indication information, ASCII characters that show blank in the UI (e.g. 0x10, 0x11, 0x12, 0x13, 0x14, etc.) may be used to encode the information. So even the message is copied into an environment that does not implement the method according to embodiments of the present disclosure, there will not be any gibberish.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a chat message, comprising:
  receiving, from a first device, a selection of an emoji to be used in a chat session, wherein the emoji has not been sent in the chat session;
  processing one or more chat messages in the chat session to determine an emotion level of a first emotion;
  determining an emoji variation to apply, based on the determined emotion level;
  generating a modified emoji based on the selected emoji and the determined emoji variation; and
  providing, to the first device, a suggestion including the modified emoji, wherein the modified emoji is displayed on a user interface of the first device at a time when the emoji has not been transmitted in the chat session.

2. The method of claim 1, wherein the determined emotion level is one of a plurality of predefined emotion levels, and wherein the determined the emoji variation has a predefined association with the determined emotion level.

3. The method of claim 1, further comprising:
  transmitting a chat message including information about the selected emoji and the determined emoji variation.

4. The method of claim 3, wherein the information about the emoji variation includes the determined emotion level.

5. The method of claim 3, wherein the information about the emoji variation in the chat message is encoded with ASCII characters that are rendered as blank characters in the user interface.

6. The method of claim 1, wherein the emoji variation includes at least one of the following: (i) shaking, (ii) jumping, and (iii) a size change.

7. The method of claim 1, the method further comprising determining an emotion category, wherein determining the emoji variation to apply is further based on the emotion category.

8. A system for processing a chat message, comprising:
  one or more computer processors; and
  a memory containing a program which when executed by the one or more computer processors performs an operation, the operation comprising:
    receiving, from a first device, a selection of an emoji to be used in a chat session, wherein the emoji has not been sent in the chat session;
    processing one or more chat messages in the chat session to determine an emotion level of a first emotion;
    determining an emoji variation to apply, based on the determined emotion level;
    generating a modified emoji based on the selected emoji and the determined emoji variation; and
    providing, to the first device, a suggestion including the modified emoji, wherein the modified emoji is displayed on a user interface of the first device at a time when the emoji has not been transmitted in the chat session.

9. The system of claim 8, wherein the determined emotion level is one of a plurality of predefined emotion levels, and wherein the determined the emoji variation has a predefined association with the determined emotion level.

10. The system of claim 8, the operation further comprising:
  transmitting a chat message including information about the selected emoji and the determined emoji variation.

11. The system of claim 10, wherein the information about the emoji variation includes the determined emotion level.

12. The system of claim 10, wherein the information about the emoji variation in the chat message is encoded with ASCII characters that are rendered as blank characters in the user interface.

13. The system of claim 8, wherein the type of emoji variation includes at least one of the following: shaking, jumping, color change or size change.

14. The system of claim 8, the operation further comprising determining an emotion category, wherein determining the emoji variation to apply is further based on the emotion category.

15. A computer program product comprising a computer readable storage medium having program instructions embodied therewith, the program instructions readable by a device to cause the device to perform an operation comprising:
  receiving, from a first device, a selection of an emoji to be used in a chat session, wherein the emoji has not been sent in the chat session;
  processing one or more chat messages in the chat session to determine an emotion level of a first emotion;
  determining an emoji variation to apply, based on the determined emotion level;
  generating a modified emoji based on the selected emoji and the determined emoji variation; and
  providing, to the first device, a suggestion including the modified emoji, wherein the modified emoji is displayed on a user interface of the first device at a time when the emoji has not been transmitted in the chat session.

16. The computer program product of claim 15, wherein the determined emotion level is one of a plurality of predefined emotion levels, and wherein the determined emoji variation has a predefined association with the determined emotion level.

17. The computer program product of claim 15, the operation further comprising:
  transmitting a chat message including information about the selected emoji and the determined emoji variation.

18. The computer program product of claim 17, wherein the information about the emoji variation includes the determined emotion level.

19. The computer program product of claim 15, wherein the emoji variation includes at least one of the following: (i) shaking, (ii) jumping, and (iii) a size change.

20. The computer program product of claim 17, wherein the information about the emoji variation in the chat message is encoded with ASCII characters that are rendered as blank characters in the user interface.

* * * * *